Figure 1:
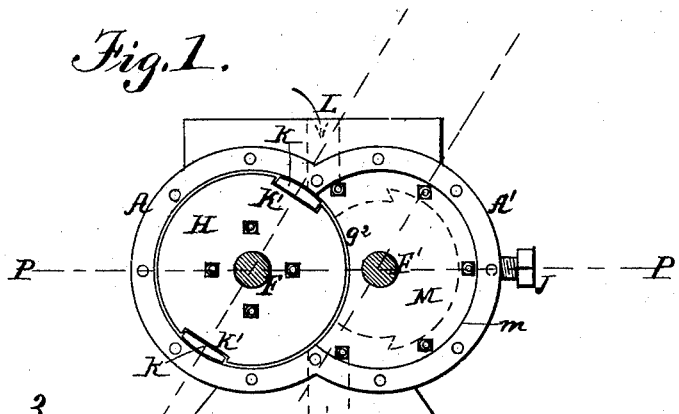

(No Model.) 3 Sheets—Sheet 1.

R. L. FROST.
ROTARY PUMP.

No. 363,739. Patented May 24, 1887.

Witnesses:
R. E. Grant
H. R. Avant

Inventor:
Richard L. Frost
By his Attorneys
Johnson and Johnson (No Model.) 3 Sheets—Sheet 2.
R. L. FROST.
ROTARY PUMP.
No. 363,739. Patented May 24, 1887.
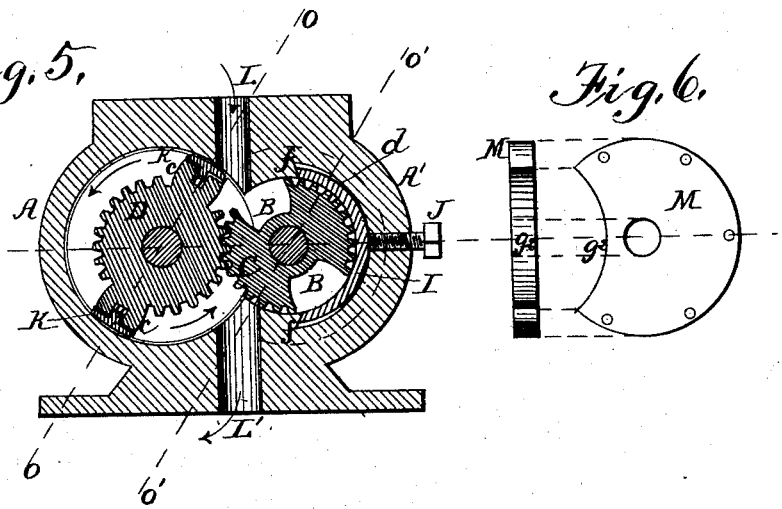

(No Model.) 3 Sheets—Sheet 3.
R. L. FROST.
ROTARY PUMP.
No. 363,739. Patented May 24, 1887.
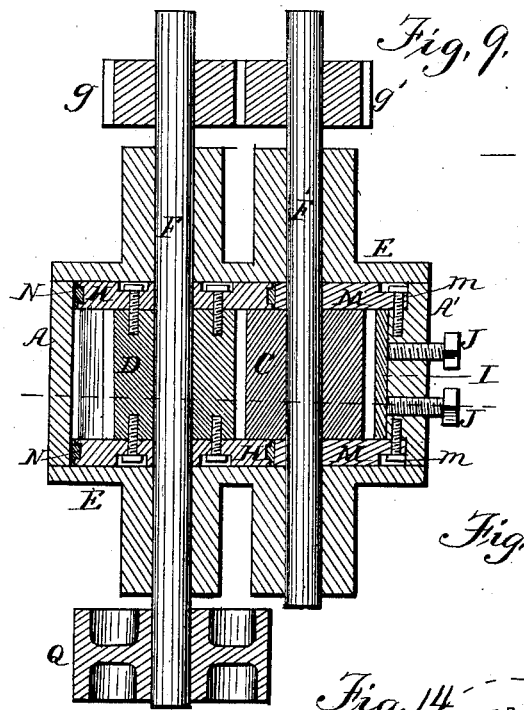
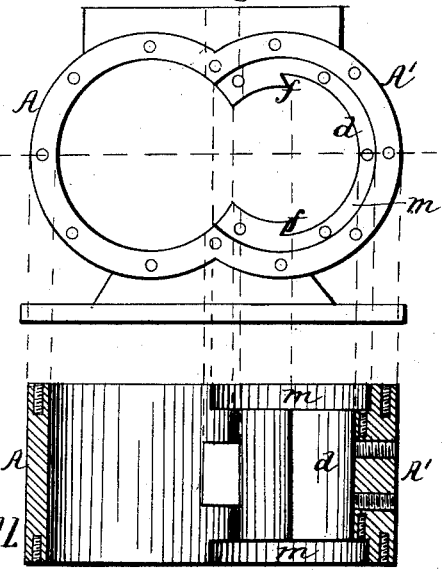
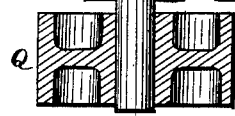
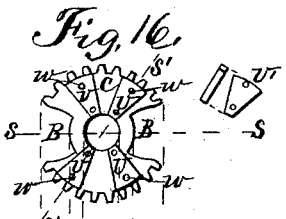
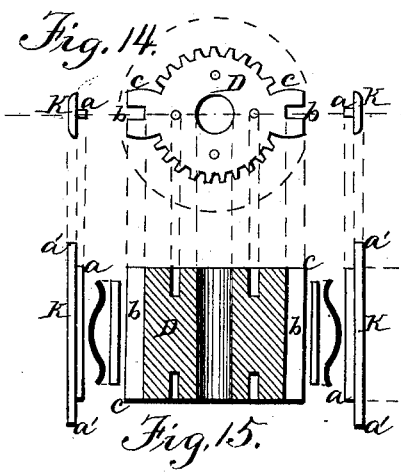
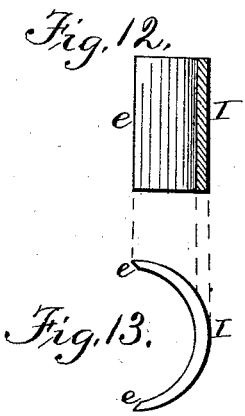
Witnesses:
R. E. Grant
H. R. Avant
Inventor:
Richard L. Frost
By his Attorney
Johnson & Johnson

UNITED STATES PATENT OFFICE.

RICHARD L. FROST, OF BATTLE CREEK, MICHIGAN.

ROTARY PUMP.

SPECIFICATION forming part of Letters Patent No. 363,739, dated May 24, 1887.

Application filed July 20, 1886. Serial No. 208,560. (No model.)

*To all whom it may concern:*

Be it known that I, RICHARD L. FROST, a citizen of the United States, residing at Battle Creek, in the county of Calhoun and State of Michigan, have invented new and useful Improvements in Rotary Pumps, of which the following is a specification.

My invention relates to improvements in rotary pumps in which a rotary piston co-operates with a rotary abutment within a cylinder composed of two hollow intersecting cylinders, the said piston and abutment parts being geared together, so as to rotate synchronously in opposite directions, a portion of each revolving part being caused to extend into and revolve within a portion of the chamber of each cylinder part, and having intermatching projections and recesses whereby to form inlet and outlet spaces within the case at the intersection of the said chambers, so as to cause the piston projections to draw or suck the water into the chambers at the same time they operate to force it out.

In improving such rotary pump my objects are to render the pump practically noiseless, of economical construction, and to permit the co-operating piston parts to travel at high velocities. The co-operating piston parts are geared together both internally and externally, the better to maintain the joint between their piston-coacting parts, and to give them a positive connection both inside and outside of the pump, and to relieve their outside gear of undue strain. The provision for packing the revolving piston forms a continuous wearing circle at each end of the piston in which the longitudinal and segmental packing-strips are caused to revolve over or around the piston-chamber walls and the abutment end plates without striking the edges or points of intersection of the two cylinder-chambers. This packing provision forms joints with the chamber-walls and with the end plates of the abutment-chamber between the meeting walls of said chambers, at which point the end segmental plates M form edge joints with the extended ends of the piston-strips, so that the latter form wearing-joints upon the end plates M after they leave the walls of the case. This is an important feature of my improvement, as my pump would not work if there was not an exact circle maintained by the packing-strips K as they cross at the intersecting chambers, because were it not for the piston-strips extending at their ends over concave edges of the plates M these piston-strips would strike against the joints formed by the end plates M and stop the pump or make a noise. This construction, so far as I know and can find, is new in a rotary pump or motor, and in such construction each packing part of each revolving part and of the chamber of the revolving abutment part co-operate to produce an effective packing for both chambers in a manner to lessen the power required to operate the pump. These and other matters in their construction and in their co-operation I will now describe in connection with the accompanying drawings, in which—

Figure 3:
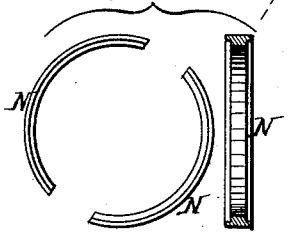
Figure 4:
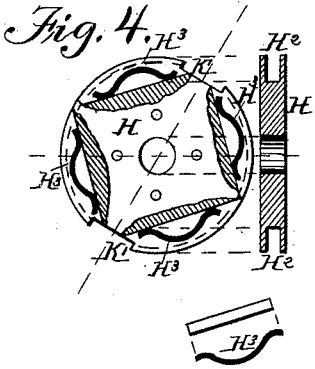
Figure 2:
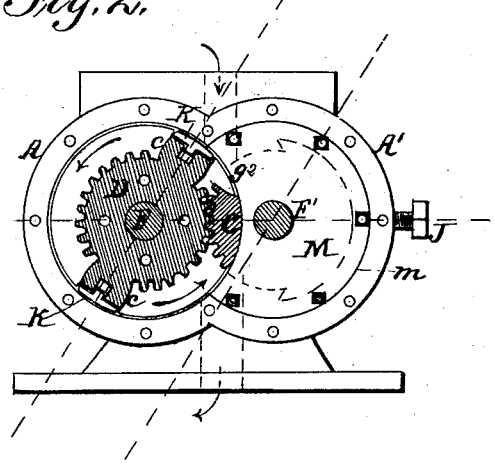

Figure 1 represents in end elevation my improved rotary pump, showing the cylinder-head removed, and Fig. 2 a similar view showing both the cylinder-head and the end packing-plate of the piston removed. Fig. 3 shows the segments for one of the end plates H of the piston. Fig. 4 represents one of the end plates of the piston in sectional views, showing the springs upon which the packing-segments are seated in said plates. Fig. 5 represents a vertical cross-section of the pump, showing the co-operating piston and abutment parts and their packing devices. Fig. 6 shows one of the end packing-segments of the abutment part, over and upon the concave edge part of which the piston-packing segments N and the longitudinal packing-strips K travel or ride in joint-forming contact. Fig. 7 represents a vertical section taken on the line O O of Fig. 5, and Fig. 8 represents a similar view taken on the line O' O' of Fig. 5. Fig. 9 represents a horizontal axial section of the pump, taken through the line P P of Fig. 1. Fig. 10 represents the twin cylinder-shell in end elevation, the head and the co-operating piston parts being removed, and Fig. 11 shows the same in horizontal section. Figs. 12 and 13 show the packing-segment for the revolving abutment part. Fig. 14 shows an end view of the revolving piston-gear and its packing-strips, and Fig. 15 shows an axial sectional view of the same with its packing-strips and springs removed. Fig. 16 shows an end view of the abutment-gear; Fig. 17, a longitudinal central section on the line $s\ s$, and Fig. 18 a similar view on the line $s'\ s'$ of Fig. 16.

The coacting moving members of the pump include a rotary piston-gear, D, provided with two or more longitudinal surface-pistons, K, projecting radially beyond the gear body, and a second rotary gear, C, forming an abutment. These two geared bodies D and C are arranged with their axes parallel, so that their cogged surfaces mesh with each other. They are rigidly mounted upon their respective shafts F and F' within the shell or case, which forms twin cylinders A and A', as seen in Fig. 9. The shaft of each gear part is fitted in suitable bearings in the case and projects alike from one of the case-heads to be connected by twin gear $g\ g'$, so that the rotation of the piston-gear D and its shaft F will cause an equal rotation of the abutment-gear C, and its shaft in a reverse direction. The shell or case A A' forms a duplex cylinder—that is, its interior forms two segmental chambers intersecting each other at their junction. These chambers may be of unequal diameter, and they open into each other, and when the two gear parts are respectively arranged within said segmental chambers a portion of each shall project from its chamber into the other, and thereby admit of a construction in which the longitudinal piston-projections from the gear part D work into corresponding longitudinal grooves in the abutment part. As shown, the gear parts of the piston D and of the abutment are of equal diameter, so that their revolutions will be controlled by the twin gear of their shafts; but the piston-projections of the gear part D require that the chamber within which it works shall be larger than that within which the abutment works. The twin cylinder shell or case is closed at its ends by heads E, through which the shafts of the revolving piston and abutment parts pass, and are fitted in bearings, while the inlet L and the outlet L' pass through the shell in line from the top to the bottom opening into the chambers of the junction of the piston and abutment-gears. The segmental chambers are of the same length, and the piston-chamber proper forms the passage for the inflow to the outflow, as shown by the arrows in Fig. 5.

To each end of the piston D is firmly bolted a head, H, Figs. 4, 7, and 9, having a diameter a little less than that of the interior of the chamber of the case, as seen in Fig. 1. These heads have circumferential grooves $H^2$, within which are placed segmental packing-plates N N, seated upon plate-springs $H^3$, which constantly act to press the segmental packing-plates out against the inner walls of the cylinder-chamber. These head-plates H have two or more circumferential notches or recesses, K', adapted to receive the ends of packing-strips K, which are provided with tongues $a$, which fit into grooves $b$, formed in the faces of the radial piston-projections $c$ of the piston-gear. These packing-strips K are placed lengthwise of the piston-gear, and while their tongues $a$ fit in the grooves $b$ of the piston-body, their ends $a'$ extend over the heads H and are held in place by the notches K' therein, the length of the packing-strips being equal to that of the piston-gear, including the thickness of its heads. The ends of the segmental packing-plates N join the opposite edges of the piston-strips K, and the plate-springs $H^3$ are placed in recesses between the notches.

The abutment-gear C is made with longitudinal surface recesses or grooves B, adapted to receive the piston-projections in the revolutions of the coacting parts, and is fixed upon the shaft F', having its surface between said grooves cogged to mesh with the cogs of the piston-gear. The cylinder-chamber for the abutment-gear is of a diameter to fit its cogged surface, and that part of its wall in the outer side of its case is cut away to form a segmental recess, $d$, Figs. 5, 10, 12, and 13, to receive a segmental packing-plate, I, thickest at that part midway between its ends. This form gives a double-wedge shape to the segment-packing and it embraces about half the diameter of the abutment-gear from end to end of the latter. Its ends $e$ are cut beveling, and the shoulders $f$ of the case-wall recess $d$ have a corresponding bevel to form seats for the segment-packing to support the latter in its adjustment to maintain a packed wearing-joint with the abutment-gear. This adjustment is made by screws J J, screwed in the case so as to bear equally upon the thickest part of the segment, and it is this middle or thickest part which is thus kept in joint-forming contact with the abutment-gear. The object of making the ends or edges of the segment and the seats in the case-wall beveled is to keep the side edges or ends constantly pressing upon their seats in an outward direction, and thereby prevent its edges or ends from projecting within the chamber within the circle described by the cogs of the abutment-gear. As the segment tapers from its middle to each end, and as the chamber-wall recess is of the same area at every point, it will be seen that the tapering ends of the segment have room to expand within the recess as the screws are driven in against the middle thick part of said segment, so that only the thick portion of the latter and its inner walls form the packing-joint and permit the wear to be taken up for a much longer time than if the plate was of uniform thickness.

The chamber of the abutment-gear at each end of the latter is fitted with head-plates M, firmly secured to the case by bolts, and of a thickness and diameter corresponding to the piston-heads. These head-plates M are cut away so as to form segments, as seen in Figs. 1 and 6, and the cut-away part $g^2$ must complete the circle of the chamber of the piston-gear for the important purpose of permitting the extended ends of the piston-strips K to form a joint with the concave edges $g^2$ of each head M in revolving over them. This construction permits the piston-packing strips K to revolve over or around their chamber-walls without striking the edges or points of intersection of the two cylinders, and permits the piston and abutment parts to revolve at high speed, with the advantage of having a joint-forming connection in the space at the junction of the twin cylinders with the two head-plates M. By this construction the piston-strips form packed joints with the chamber-wall and with the heads M between the meeting walls of the two chambers.

The manner of forming the continuous wearing circles at each end of the piston-gear chamber is an important feature of my improvement, and I make them, in constructing the twin cylinder, as follows, viz: The chamber for the abutment-gear is first bored out. Then at its ends it is counterbored to form the grooves $m$, within which the plates M are secured, as stated, and then the chamber of the piston-gear is bored out, at the same time boring or cutting away the segment-pieces of the plates M, which project into said chamber, thus forming the end circles complete, of which the concave edges $g^2$ of both the plates M form a part over which the ends of the packing-strips revolve and form a wearing-joint. The face or body of the abutment-gear being packed by the segmental plate I, it is necessary, also, to pack the ends of the abutment, and this I do by wedge-shaped packing-plates U' U', fitted into corresponding recesses U U in the end faces of the abutment, as in Figs. 16 and 18, and held in place by pins $w$, over which said plates are free to move a little parallel to the shaft. These packing-plates U' are constantly pressed outward by springs $x$, placed in the recesses U, behind said plates, and thus serve to pack the ends of the abutment-gear with the case-plates M M.

Power being applied to the shaft F by a belt from the pulley Q, the piston-gear revolves in the direction of the arrows, giving the abutment-gear a reverse motion, and, as the piston-projections pass over the inlet-opening L, a vacuum or suction will be produced in the chambers between the revolving devices, and the fluid will rush in and fill the space until the next succeeding piston-projection carries it around in the chamber and forces it out of the opening L', with which the supply-pipe connects. In this way, as the piston-gear revolves, each piston draws or sucks in the water at the same time it is forcing it out. Power may be applied in any suitable way by gear or by couplings, and the pump will operate whichever way the piston-gear revolves.

The device may be used as a motor operated by steam, compressed air, or by gas or water under pressure, in which case power is taken from the shaft.

As the abutment-gear serves primarily as a joint-forming revolving device to the piston, it is therefore important that it should be packed in its wall-forming closure, and that such packing should offer the least friction to its revolution, should be easily adjusted to take up wear, and should give a uniform bearing upon the face of the revolving part.

Referring to the piston-packing strips and their function and relation to the abutment end plates M, it is important to notice that the said packing-strips K are of a length equal to that of the piston D and both its end plates, as seen in Fig. 7, for the purpose of obtaining an edge-surface bearing on the fixed end plates M of the abutment, whereby to provide a continuous bearing for the extended ends $a'$ of the spring-sustained piston-strips K, as shown in Fig. 2. It is this feature which renders my pump effective in its operation and increases its durability. So in like manner do the segmental packing-strips N N of the piston-heads H H co-operate with the segmental bearing-edges $g^2$ of the fixed end plates M, to perfect the packing and increase the effectiveness and durability of my pump.

I claim—

1. The combination, in a rotary pump, of the twin cylinders having intersecting chambers provided with an inlet and an outlet with coacting piston and abutment parts, the piston D, having the end plates H, and the packing-strips K, the latter having a length equal to that of the piston, including the thickness of its end plates, and the fixed end plates M, having a segmental bearing part, $g^2$, for the ends of the said piston-packing strips, substantially as described, for the purpose stated.

2. The combination of the pump-cylinder having intersecting chambers A A' and the piston D, having the longitudinal piston parts $c\ c$, provided with the packing-strips K, and the piston end plates H, provided with the packing-segments N, which join the edges of said strips, with the abutment C and the fixed segmental end plates M, the said strips K forming wearing-joints with the interior cylinder-walls, A, and also forming, in connection with the segmental strips N, the wearing-joints upon the concave parts $g^2$ of the fixed end plates M at the intersection of both cylinder-chambers, substantially as described, for the purpose specified.

3. The combination, with the coacting piston and abutment parts of a rotary pump, of the piston parts D C, having the end plates H H, each provided with the packing segments N N, and having packing-strips K, extending from the outer face of one end plate H to the outer face of the other, joining the ends of the said segments N, the fixed segmental end packing-plates M, and the segmental packing-plate I of the abutment parts, these said packing parts K, N, M, and I co-operating to pack the piston in its chamber A, the abutment in its chamber A', and the joining of the piston and the abutment parts at the wearing-joints $g^2$ of the fixed and revolving end plates, H and M, substantially as described.

4. The coacting piston and abutment parts of a rotary pump, the said piston part D having the end plates H H, the packing-strips K K, and the packing-segments N N, and the said abutment part C having the self-adjusting wedge-shaped end packing-plates U' U', in combination with the twin cylinders having intersecting chambers, one of the latter having the fixed segmental end packing-plates M, and the segmental wall packing-plate I, whereby the chambers of the coacting piston and abutment parts are packed and the said parts themselves are packed at the ends of the piston and at the ends of the abutment and at $g^2$ between the chambers, substantially as described.

5. The combination, in a rotary pump, of the twin cylinders having communicating chambers, with the abutment device C, having surface cogs, longitudinal surface grooves B B, and self-adjusting end plates U' U', confined by pins $w$, the segmental packing-plate I, the coacting piston-gear having the grooved piston projections, the tongued packing-strips K, having a length greater than that of the piston proper, and the end plates, H and M, all constructed and arranged for operation substantially as described.

In testimony whereof I have hereunto set my hand in the presence of two subscribing witnesses.

RICHARD L. FROST.

Witnesses:
N. E. HUBBARD,
I. N. MERRITT.